F. R. KOLB.
SUPPLEMENTAL HANDLE FOR COOKING UTENSILS.
APPLICATION FILED JAN. 3, 1918.

1,365,703.

Patented Jan. 18, 1921.

Witnesses

Inventor
F. R. Kolb
By
Attorney

UNITED STATES PATENT OFFICE.

FELIX R. KOLB, OF BLUE SPRINGS, MISSISSIPPI.

SUPPLEMENTAL HANDLE FOR COOKING UTENSILS.

1,365,703.  Specification of Letters Patent.  Patented Jan. 18, 1921.

Application filed January 3, 1918. Serial No. 210,162.

*To all whom it may concern:*

Be it known that I, FELIX R. KOLB, a citizen of the United States, residing at Blue Springs, in the county of Union, State of Mississippi, have invented certain new and useful Improvements in Supplemental Handles for Cooking Utensils, and I do hereby declare the following to be a full, clear, and exact description of the invention, such as will enable others skilled in the art to which it appertains to make and use the same.

This invention relates to supplemental handles for cooking utensils and it has for its object to provide a handle that may be engaged over the usual handle of a sauce pan or similar article to form an extension of a character that will not burn the hand of the user, the supplemental handle to have such formation as to effect a bracing of the main handle over which it is fitted.

In the drawings:—

Figure 1:
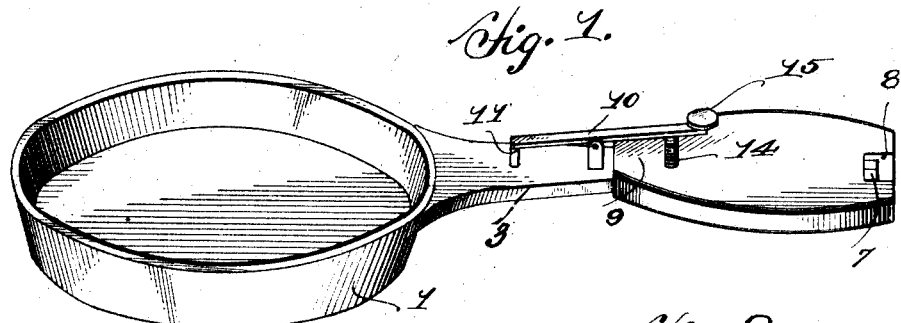
Figure 1 is a perspective view of a pan showing the handle attached thereto.
Figure 2:
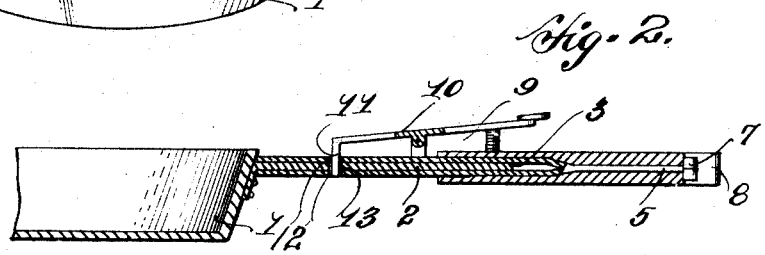
Fig. 2 is a longitudinal section through a portion of the utensil and the handle.
Figure 3:
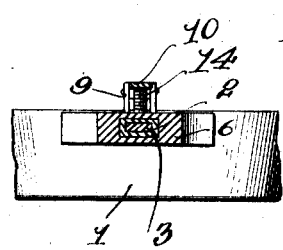
Fig. 3 is a transverse section.
Figure 4:
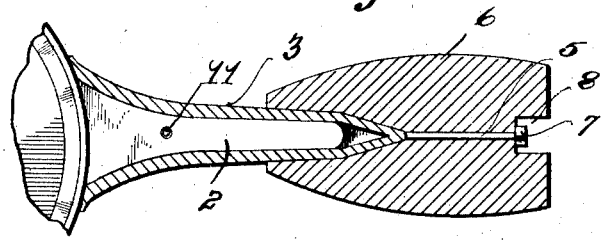
Fig. 4 is a horizontal section.
Figure 5:
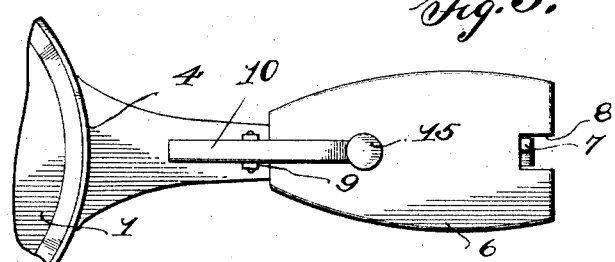
Fig. 5 is a plan view.

Referring more particularly to the drawings, 1 represents a cooking utensil, which may be a frying pan, stew pan, or other receptacle which is placed in direct contact with the fire, so that its handle 2 becomes heated, and therefore must usually be grasped with the aid of a towel or other protective device. According to the construction of this invention, I provide a socket member 3 which consists of a metal element which is interiorly recessed so as to fittingly receive the handle 2 of the utensil. Furthermore, the forward end of the socket member 3 is readily spread, fanwise so that its forward edge assumes the shape of an arc 4 which, when the handle 2 is inserted into the socket, will bear snugly against the curvature of the rim of the utensil continuously of the upper and side faces of the base of the main handle, to prevent any lateral rocking of the latter in the event that the handle 2 does not closely fit the socket 3.

The rear end of the socket 3 is continued in a shank 5 which has its rear extremity threaded. Then, a wooden hand grip 6 is fitted over the stem 5 and the major portion of the socket 3. Then a nut 7 is turned upon the threaded extremity of the stem 5 and seated in a recess 8 in the hand grip 6.

Mounted upon a standard 9 which rises from the top of the socket member 3 is a rock lever 10 whose forward end carries the locking pin 11. Said locking pin 11 operates vertically through apertures 12 which are formed through the walls of the socket 3, so that the pin 11 may traverse the socket opening. Then, when the handle 2 is inserted into the socket 3, an aperture 13 registers with the apertures 12, and the locking pin 11 engaging both the apertures 12 and 13 will lock the handle 2 and the removable handle together. Normally, a spring 14 which is interposed between the rear end of the rock lever 10 and the socket 3, throws the pin 11 into locking position from which it may be retracted by pressure upon the finger piece 15 carried by the rear end of the lever 10.

It will be apparent from the foregoing description that when the detachable handle is employed, it will be possible to lift the hottest dishes or utensils from the stove, and furthermore it will be apparent that the detachable handle will be employed without danger of becoming detached, since it is positively locked in position by the automatic action of the spring 14 in placing the pin 11 into engagement with the openings 12 and 13. Also, the concaved expansion 4 of the forward end of the socket, which bears against the lip or margin of the utensil and follows its contour accurately, prevents any sidewise motion of the utensil with relation to the handle which might cause the contents of the utensil to be spilled.

What I claim as my invention is:—

A detachable handle for pans comprising a hollow socket member having an open end to receive the pan handle and having a terminally threaded rod at its opposite end, a grip disposed upon the rod and the socket member, a nut engaged with the terminal of the rod, the socket member having registering perforations in its upper and lower walls, a latch pivoted to the socket member and having a pin disposed to engage at times in the perforations of the socket member, the opposite end of the latch overlying the grip, and means for holding the latch with the pin yieldably in the perforations.

In testimony whereof, I affix my signature in the presence of two witnesses.

FELIX R. KOLB.

Witnesses:
G. M. HOUSTON,
W. J. SANDLIN.